US012638147B2

(12) United States Patent
Yoshikawa et al.

(10) Patent No.:    US 12,638,147 B2
(45) Date of Patent:        May 26, 2026

(54) SURFACE ILLUMINATION DEVICE, SPACE INCLUDING SURFACE ILLUMINATION DEVICE, AND ILLUMINATION METHOD

(71) Applicant: NITTO DENKO CORPORATION, Osaka (JP)

(72) Inventors: Takahiro Yoshikawa, Osaka (JP); Kozo Nakamura, Osaka (JP); Yufeng Weng, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 0 days.

(21) Appl. No.: 18/017,240

(22) PCT Filed: Jul. 19, 2021

(86) PCT No.: PCT/JP2021/026981
§ 371 (c)(1),
(2) Date: Jan. 20, 2023

(87) PCT Pub. No.: WO2022/024843
PCT Pub. Date: Feb. 3, 2022

(65) Prior Publication Data
US 2023/0296217 A1        Sep. 21, 2023

(30) Foreign Application Priority Data
Jul. 28, 2020    (JP) ................................. 2020-127349

(51) Int. Cl.
*F21S 8/00*            (2006.01)
*F21K 9/233*         (2016.01)
(Continued)

(52) U.S. Cl.
CPC .............. *F21S 8/036* (2013.01); *F21K 9/233* (2016.08); *F21K 9/61* (2016.08); *F21K 9/69* (2016.08);
(Continued)

(58) Field of Classification Search
CPC ............. E04F 2290/026; G02B 6/0033; G02B 6/0035; G02B 6/0036; G02B 6/0038;
(Continued)

(56) References Cited

U.S. PATENT DOCUMENTS

| | | | |
|---|---|---|---|
| 11,940,120 B2 * | 3/2024 | Yoshikawa .......... | G02B 6/0091 |
| 12,025,824 B2 * | 7/2024 | She ...................... | G02B 6/0015 |

(Continued)

FOREIGN PATENT DOCUMENTS

| | | | |
|---|---|---|---|
| CH | 715534 A1 * | 5/2020 | |
| CN | 1779317 A * | 5/2006 | |

(Continued)

OTHER PUBLICATIONS

Machine translation of CN 111102498 A retrieved from the FIT database of PE2E search. (Year: 2023).*

(Continued)

*Primary Examiner* — Colin J Cattanach
(74) *Attorney, Agent, or Firm* — Greenblum & Bernstein, P.L.C.

(57)                ABSTRACT

An angle at which an intensity becomes maximum in a light distribution of light emitted from a center of a light emitting surface of a surface illumination device is in a range of −90° or more to less than 0° in a plane including a vertical axis and perpendicular to the light emitting surface, in a case where an axis passing through the center of the light emitting surface and perpendicular to the floor surface is defined as the vertical axis, and in the plane, a direction extending from the center of the light emitting surface toward the floor surface is defined as −90°, a direction extending from the center of the light emitting surface toward a side opposite to the floor surface is defined as +90°, and a direction orthogonal to the light emitting surface is defined as vertical 0°.

8 Claims, 18 Drawing Sheets

20

(51) Int. Cl.

| | | |
|---|---|---|
| *F21K 9/61* | (2016.01) | |
| *F21K 9/69* | (2016.01) | |
| *F21V 8/00* | (2006.01) | |
| *F21W 131/30* | (2006.01) | |

(52) U.S. Cl.
CPC ....... *G02B 6/0041* (2013.01); *F21W 2131/30* (2013.01); *G02B 6/0016* (2013.01); *G02B 6/0033* (2013.01); *G02B 6/0035* (2013.01); *G02B 6/0036* (2013.01); *G02B 6/0038* (2013.01); *G02B 6/004* (2013.01); *G02B 6/0043* (2013.01); *G02B 6/005* (2013.01); *G02B 6/0051* (2013.01); *G02B 6/0053* (2013.01); *G02B 6/0055* (2013.01); *G02B 6/0095* (2013.01)

(58) Field of Classification Search
CPC .... G02B 6/004; G02B 6/0041; G02B 6/0043; G02B 6/0095; G02B 6/0016; G02B 6/005; G02B 6/0051; G02B 6/0053; G02B 6/0055
See application file for complete search history.

(56) References Cited

U.S. PATENT DOCUMENTS

| | | | |
|---|---|---|---|
| 2011/0182055 A1* | 7/2011 | Kanade ............ | G02F 1/133621 362/84 |
| 2011/0244187 A1* | 10/2011 | Rinko ..................... | B32B 27/08 428/156 |
| 2012/0063164 A1* | 3/2012 | Chang .................. | G02B 6/0046 362/147 |
| 2012/0268966 A1* | 10/2012 | McCollum ................ | F21S 8/06 977/902 |
| 2013/0307420 A1* | 11/2013 | Yoder ................... | F21V 33/006 315/307 |
| 2014/0043847 A1 | 2/2014 | Yang et al. | |
| 2016/0131816 A1* | 5/2016 | Kinoshita ............ | G02B 6/0055 362/606 |
| 2017/0329064 A1* | 11/2017 | Dor ........................ | G02B 6/001 |
| 2018/0288844 A1 | 10/2018 | Fujii | |
| 2019/0339427 A1* | 11/2019 | Emmons .............. | G02B 6/0053 |
| 2020/0348462 A1 | 11/2020 | Hattori et al. | |
| 2021/0003766 A1 | 1/2021 | Rinko | |
| 2021/0011211 A1* | 1/2021 | Rinko .................. | G02B 5/0247 |
| 2021/0109274 A1 | 4/2021 | Rinko et al. | |

FOREIGN PATENT DOCUMENTS

| | | | | |
|---|---|---|---|---|
| CN | 111102498 A | * | 5/2020 | ................ F21S 8/00 |
| JP | 2012-119094 | | 6/2012 | |
| JP | 2013-218873 | | 10/2013 | |
| JP | 2013-218946 | | 10/2013 | |
| JP | 2013218946 A | * | 10/2013 | |
| JP | 2013-254662 | | 12/2013 | |
| JP | 2015-2138 A | | 1/2015 | |
| JP | 2015002138 A | * | 1/2015 | |
| JP | 2015-532767 | | 11/2015 | |
| JP | 2019-75352 | | 5/2019 | |
| JP | 2019-75352 A | | 5/2019 | |
| JP | 2020-4610 | | 1/2020 | |
| JP | 2020-35580 | | 3/2020 | |
| JP | 2020-507907 A | | 3/2020 | |
| WO | 2011/030284 | | 3/2011 | |
| WO | WO2011/124765 A1 | | 10/2011 | |
| WO | WO2011/127187 A1 | | 10/2011 | |
| WO | 2014/119148 | | 8/2014 | |
| WO | WO2019/102959 A1 | | 5/2019 | |
| WO | WO-2019087118 A1 * | | 5/2019 | .......... G02B 6/0038 |
| WO | WO2019/146628 A1 | | 8/2019 | |
| WO | 2019/180676 | | 9/2019 | |
| WO | 2019/182091 | | 9/2019 | |
| WO | WO2019/182091 A1 | | 9/2019 | |

OTHER PUBLICATIONS

Machine translation of JP 2015002138 A retrieved from the FIT database of PE2E search. (Year: 2023).*

Machine translation of JP 2013218946 A retrieved from the FIT database of PE2E search. (Year: 2024).*

Machine translation of JP 2015002138 A retrieved from the FIT database of PE2E search. (Year: 2024).*

Machine translation of CN 1779317 A retrieved from the FIT database of PE2E search. (Year: 2024).*

Machine translation of CH 715534 A1 retrieved from the FIT database of PE2E search. (Year: 2024).*

Search Report in International Application No. PCT/JP2021/026981, dated Oct. 5, 2021, and an English translation thereof.

Written Opinion in International Application No. PCT/JP2021/026981, dated Oct. 5, 2021.

Extended European Search Report received in EP Application No. 21849072.0, dated Jul. 5, 2024.

Taiwan Office Action issued in Application No. 110127134, dated Jan. 16, 2025, and English language.

Japan, Notice of Reasons for Refusal received in JP Application No. 2022-540201, dated Dec. 3, 2024, and English language translation thereof.

Panasonic Electric Works Solutions Corporation, "Facility, Outdoor, and Store Lighting, General Catalog," (Apr. 2020) along with an English translation thereof.

Evidence Statement in Patent Opposition Case for Corresponding JP Patent No. 7666822, mailed Dec. 24, 2025, along with an English translation thereof.

Notice of Sending a Duplicate Opposition in Patent Opposition Case for Corresponding JP Patent No. 7666822, mailed Dec. 24, 2025, along with an English translation thereof.

Written Amendment in Patent Opposition Case for Corresponding JP Patent No. 7666822, mailed Dec. 24, 2025, along with an English translation thereof.

Notice of Opposition to Patent in Patent Opposition Case for Corresponding JP Patent No. 7666822, mailed Dec. 24, 2025, along with an English translation thereof.

Office Action issued in Corresponding KR Patent Application No. 10-2023-7001982, dated Jan. 29, 2026, along with an English translation thereof.

Notice of Reasons of Cancellation issued in Patent Opposition Case of Corresponding JP Patent No. 7666822, mailed Mar. 3, 2026, along with an English translation thereof.

* cited by examiner

SURFACE ILLUMINATION DEVICE, SPACE INCLUDING SURFACE ILLUMINATION DEVICE, AND ILLUMINATION METHOD

TECHNICAL FIELD

The present invention relates to a surface illumination device, a space including the surface illumination device, and an illumination method.

BACKGROUND ART

As teleworking spreads, an illumination environment is given more importance not only in offices but also in homes. Light emitting diodes (LEDs), which consume low power and have a long life, are widely used as light sources of illumination devices. For LED illumination, the luminous flux from one LED is small, and thus, it is common to use a plurality of LEDs together. Such LED illumination produces a phenomenon called "multi-shadow" in which shadows are generated as many as the number of light sources, and as a result, flicker occurs.

A one-side illumination device/window that can be used as both an illumination device and a window is proposed (see Patent Document 1, for example). When illumination is on at night or the like, light emitted from a light source is incident on the end portion of a plate-shaped transparent substrate, is guided through the inside of the transparent substrate, and is emitted from only one side of the transparent substrate. When illumination is off during daytime or the like, the transparent substrate functions as a transparent window.

RELATED-ART DOCUMENTS

Patent Documents

Patent Document 1: International Publication Pamphlet No. WO2019/102959

SUMMARY OF THE INVENTION

Problem to be Solved by the Invention

The one-side illumination device disclosed in Patent Document 1 has reflective recesses on a surface on the opposite side of the transparent substrate from a light emitting surface so as to scatter light. Light emitted from the one-side is directly perceived by a user. Therefore, flicker may occur and the user may feel eye strain or feel stressed in some cases.

It is an object of the present invention to provide a surface illumination device with reduced flicker, a space including the surface illumination device, and an illumination method.

Means to Solve the Problem

One aspect of the present invention provides a surface illumination device for placement on a side wall that is perpendicular to a floor surface in a space including the side wall and the floor surface. In the surface illumination device, an angle at which an intensity becomes maximum in a light distribution of light emitted from a center of a light emitting surface of the surface illumination device is in a range of −90° or more to less than 0° in a plane including a vertical axis and perpendicular to the light emitting surface, in a case where an axis passing through the center of the light emitting surface and perpendicular to the floor surface is defined as the vertical axis, and in the plane perpendicular to the light emitting surface, a direction extending from the center of the light emitting surface toward the floor surface along the vertical axis is defined as −90°, a direction extending from the center of the light emitting surface toward a side opposite to the floor surface is defined as +90°, and a direction orthogonal to the light emitting surface and extending from the center of the light emitting surface toward an emission side to which the light is emitted is defined as vertical 0°.

Effects of the Invention

With the above-described configuration, a surface illumination device with reduced flicker can be provided.

MODE FOR CARRYING OUT THE INVENTION

According to an embodiment, a surface illumination device that does not cause a user to perceive flicker or feel fatigue or stressed is provided. The surface illumination device is configured to emit light having directivity in a direction in which the light tends not to be directly perceived by the user. With favorable example configurations, loss of light is minimized and light emission efficiency is increased. In the following, specific configurations will be described with reference to the drawings.

Figure 1:
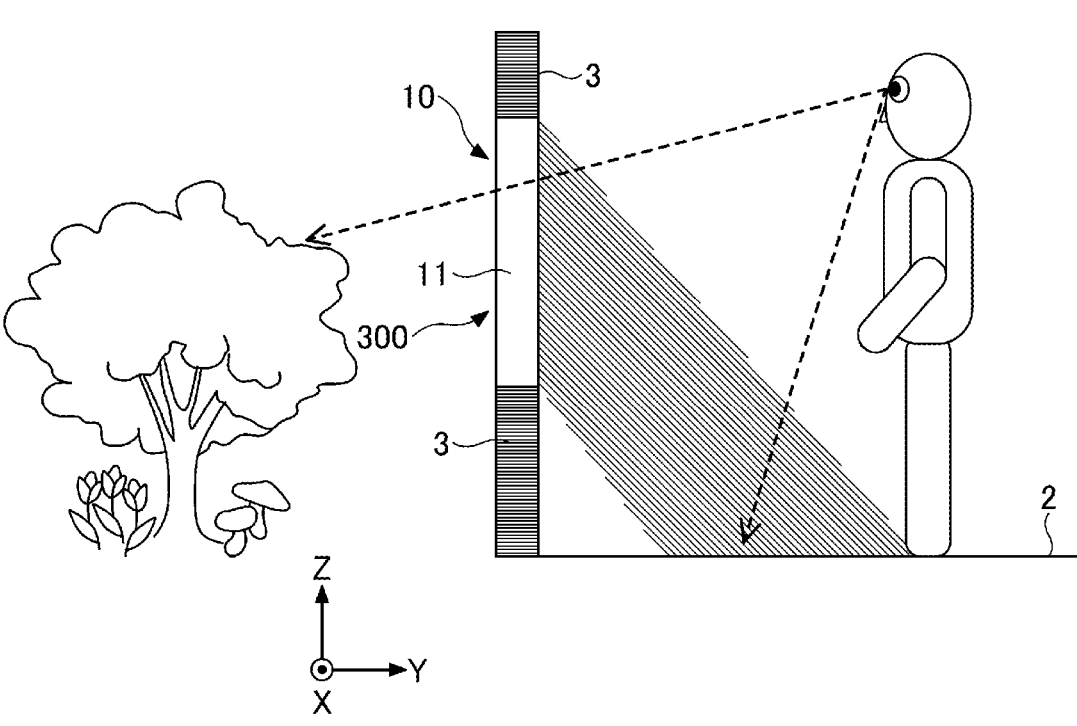
FIG. 1 is a schematic view of a space including a surface illumination device according to an embodiment.

FIG. 1 is a schematic view of a space 20 including a surface illumination device 10 according to an embodiment. The space 20 includes a floor surface 2, a side wall 3 perpendicular to the floor surface 2, and the surface illumination device 10 placed on the side wall 3. As a coordinate system, a plane parallel to the floor surface 2 is referred to as an X-Y plane, and a height direction perpendicular to the X-Y plane is referred to as a Z direction. The surface illumination device 1 is disposed in an X-Z plane, and a light emission direction is referred to as a Y direction.

The surface illumination device 10 includes a light guide 300. The light guide 300 includes a light guide plate 11 and is configured to guide light and emit light with a predetermined light distribution. If the surface illumination device 10 is used for window illumination, the transparent light guide plate 11 may be used. The visible light transmittance of the light guide 300 including the light guide plate 11 is, for example, 60% or more, 65% or more, 70% or more, 75% or more, 80% or more, 85% or more, or 90% or more. The visible light transmittance is specified as the average value of transmittance obtained by measuring the visible light at measurement wavelengths of 380 nm or more to 780 nm or less by a spectrophotometer. If the surface illumination device 10 is used for wall illumination, the light guide plate 11 is not necessarily transparent and may be translucent as long as the light guide plate 11 has a light guide function and a light emitting function.

The light guide plate 11 is formed of glass, plastic, or the like. As a glass material, quartz glass, alkali-free glass, borosilicate glass, or the like can be used. As a plastic material, acrylic resin (such as polymethylmethacrylate (PMMA)), polycarbonate (PC) resin, cycloolefin (COP) resin, or the like may be used. As will be described later, the light guide plate 11 is configured to emit light having directivity in a predetermined direction.

Figure 2:
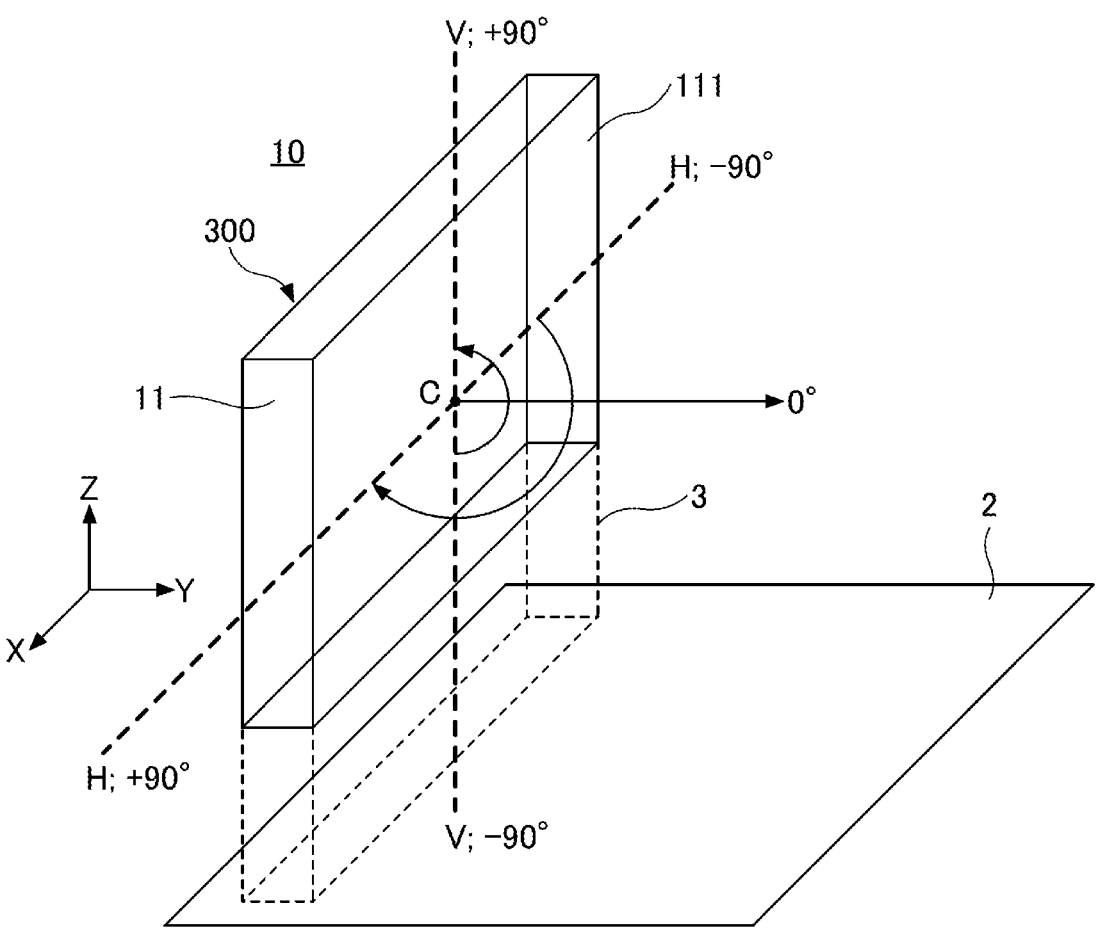
FIG. 2 is a drawing illustrating spatial coordinates of the surface illumination device.

FIG. 2 is a drawing illustrating spatial coordinates of the surface illumination device 10. The light guide plate 11 includes a first main surface 111 from which light is emitted. The first main surface 111 is substantially perpendicular to the floor surface 2. The term "substantially perpendicular" means that an error of approximately ±5° with respect to the perpendicular direction may be included. The surface illumination device 10 has a light distribution such that light, emitted from the first main surface 111, is deflected downward relative to the direction parallel to the floor surface 2. As long as this light distribution is satisfied, the first main surface 111 may have an error of approximately ±5° with respect to the direction perpendicular to the floor surface 2.

An axis passing through a center C of the first main surface 111 and perpendicular to the floor surface 2 is defined as a vertical axis or a V-axis. A direction parallel to the floor surface 2 is defined as vertical 0° in the Y-Z plane including the V-axis and perpendicular to the floor surface 2. In the Y-Z plane, an upward angle with respect to the vertical 0° is defined as a positive angle and a downward angle with respect to the vertical 0° is defined as a negative angle.

In general, considering the light distribution of light emitted from the center C in the X-Z plane perpendicular to the floor surface 2, the light can be emitted in the range of −90° to +90°. In Patent Document 1 described above, light is scattered so as to be emitted over a wide range of angles. Conversely, according to the surface illumination device 10, an angle at which the intensity becomes maximum in the light distribution of light emitted from the center of the light emitting surface is set to be in the range of −90° or more (for example, more than −90°) to less than 0°. For example, its upper limit is −0.1°, −1°, −5°, −10°, −10°, −20°, −30°, −40°, −50°, −60°, −70°, −80°, −85°, −88°, or −89°, and its lower limit is −90°, −89°, −88°, −85°, −80°, −70°, −60°, −50°, −40°, −30°, −20°, −10°, −5°, or −1°. The value of the lower limit does not exceed the value of the upper limit. Note that the light distribution of emitted light can be measured by using a viewing angle measurement device (for example, luminance/viewing angle meter EZContrast XL88 manufactured by ELDIM).

With respect to the horizontal direction, an axis passing through the center C of the first main surface 111 and parallel to the floor surface 2 is defined as a horizontal axis or an H-axis. A direction extending from the center C of the first main surface 111 toward the Y direction is defined as horizontal 0° in the X-Y plane including the H-axis and parallel to the floor surface 2. A clockwise angle from the horizontal 0° is defined as a positive angle and a counterclockwise angle from the horizontal 0° is defined as a negative angle when the X-Y plane passing through the center C is viewed from the side opposite to the floor surface (or viewed from above). In the X-Y plane passing through the center C, the light distribution of light emitted from the center C of the first main surface 111 is in the range of −90° to +90°, and, is for example, in the range of more than −90° to less than +90°. For example, its lower limit is −90°, −89°, −88°, −85°, −80°, −70°, −60°, −50°, −40°, −30°, −20°, or −10°, and its upper limit is +90°, +89°, +88°, +85°, +80°, +70°, +60°, +50°, +40°, +30°, +20°, or +10. Preferably, the surface illumination device 10 has a uniform light distribution in the horizontal direction.

Figure 3A:
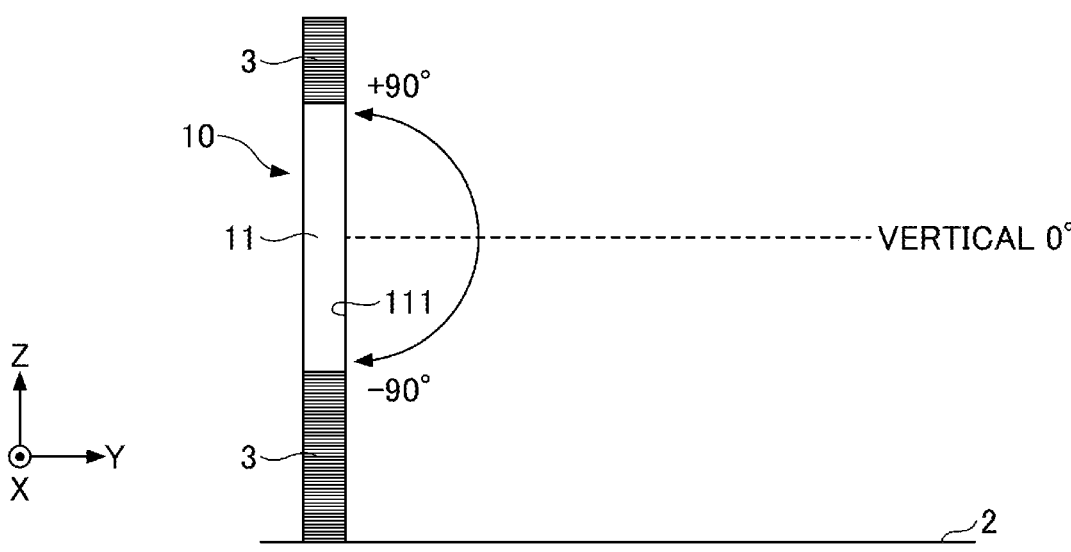
FIG. 3A is a drawing for defining angles in the direction perpendicular to a floor surface.
Figure 3B:
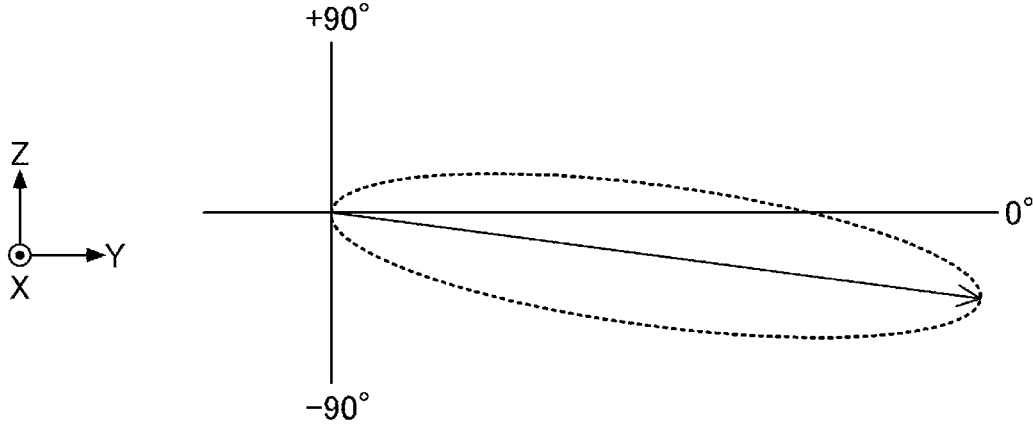
FIG. 3B is a drawing illustrating light distribution characteristics in a Y-Z plane.

FIG. 3A is a drawing for defining angles in the vertical direction of the surface illumination device 10. FIG. 3B is a drawing illustrating an example light distribution in the Y-Z plane. The coordinate system in FIGS. 3A and 3B is the same as that in FIGS. 1 and 2. In FIG. 3A, in the Y-Z plane perpendicular to the floor surface 2, a possible angular range in the vertical direction is −90° to +90°. As illustrated in FIG. 3B, the first main surface 111, which is the light emitting surface of the surface illumination device 10, is configured such that an angle at which the intensity becomes maximum in the light distribution of light emitted from the first main surface 111 is in the range of −90° or more to less than 0°.

By setting an angle (that is, an angle indicated by an arrow in FIG. 3B) at which the intensity becomes maximum in the light distribution of light emitted from the center of the light emitting surface to be in the range of −90° or more to less than 0°, a predetermined space including the floor surface 2 is illuminated with sufficient illuminance, and the emitted light is prevented from entering the user's eyes directly. Accordingly, flicker does not occur and the user can be prevented from feeling fatigue, and as a result, a comfortable illumination space can be created.

Figure 4A:
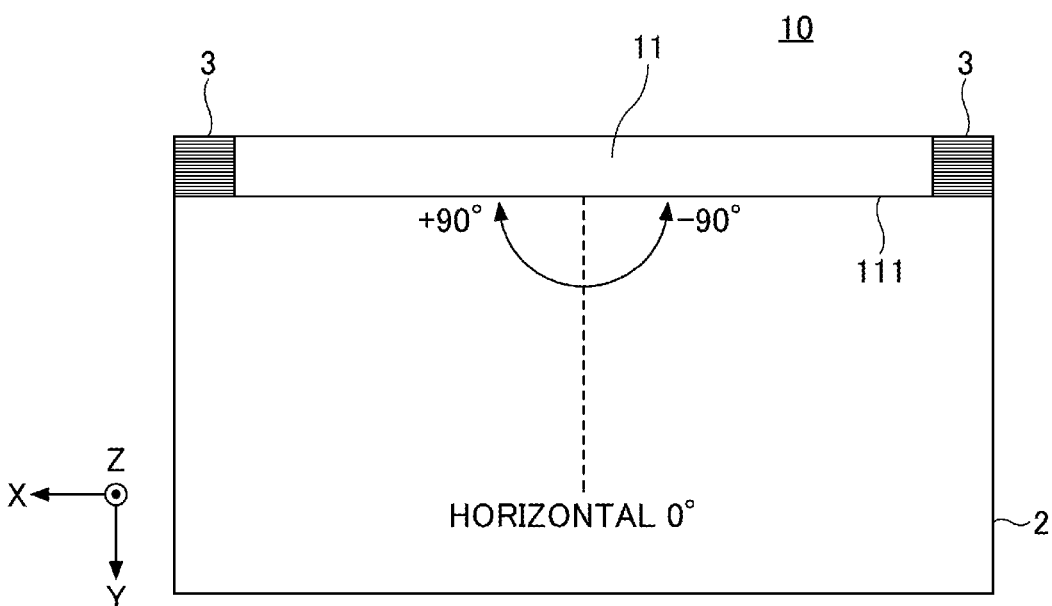
FIG. 4A is a drawing for defining angles in the direction parallel to the floor surface.
Figure 4B:
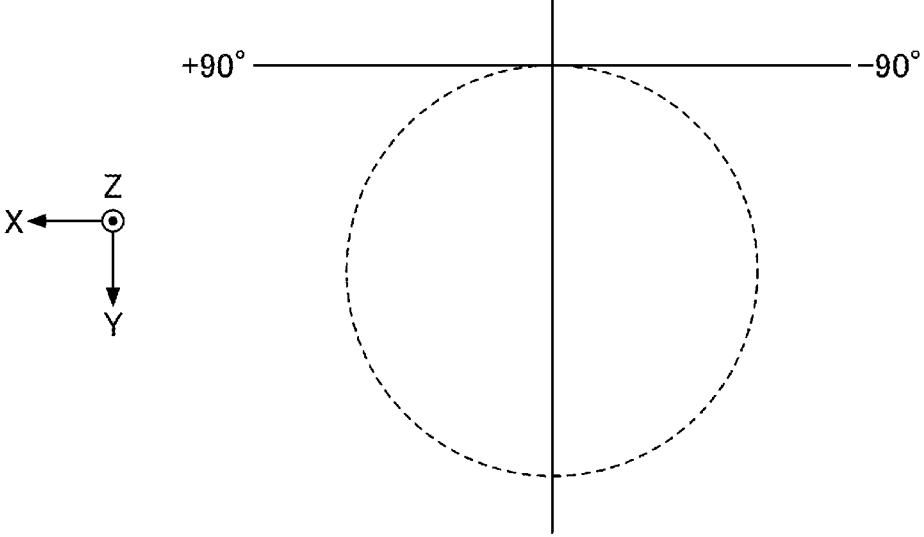
FIG. 4B is a drawing illustrating light distribution characteristics in a X-Y plane.

FIG. 4A is a drawing for defining angles in the horizontal direction of the surface illumination device 10. FIG. 4B is a drawing illustrating an example light distribution in the X-Y plane. The coordinate system in FIGS. 4A and 4B is the same as that in FIGS. 1 and 2. In FIG. 4A, the light distribution of emitted light is in the range of −90° to +90° in the X-Y plane parallel to the floor surface 2. As illustrated in FIG. 4B, the first main surface 111, which is the light emitting surface of the surface illumination device 10, is configured such that light emitted from the first main surface 111 is distributed in the range of −90° to +90° in the horizontal direction.

By setting the light distribution to be in the range of −90° to +90° in the horizontal direction, the space including the floor surface 2 can be substantially uniformly illuminated.

<Example Configuration of Surface Illumination Device>

In the following, a specific example configuration of the surface illumination device 10 will be described. In the surface illumination device 10, light is emitted from the first main surface 111 with a specific light distribution. The light guide plate 11 is configured to emit light with directivity.

Figure 5:
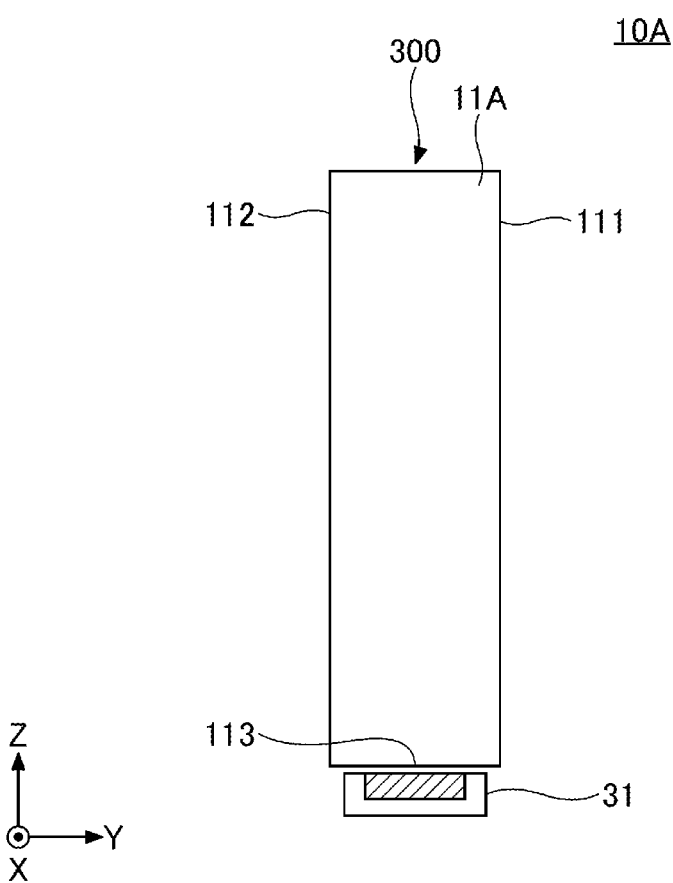
FIG. 5 is a drawing illustrating an example configuration of the surface illumination device.

FIG. 5 illustrates a surface illumination device 10A as a first example configuration of the surface illumination device 10. The surface illumination device 10A includes light sources 31 and the light guide 300 that includes a light guide plate 11A. The light guide plate 11A includes a light incident surface 113, the first main surface 111, and a second main surface 112 opposite the first main surface. The light incident surface 113 is disposed facing the light sources 31, and light from the light sources is incident on the light incident surface 113. The first main surface 111 emits light that has entered the light guide plate 11A.

In the first example configuration, the light sources 31 cause light to be incident on the light incident surface 113 of the light guide plate 11A. The light incident surface 113 is an end surface facing the light sources 31. The "end surface" is a surface that is in the thickness direction of the light guide plate 11A, perpendicular to the first main surface 111 or the second main surface 112. The configuration and the type of the light sources 31 are not limited as long as light can enter the light guide plate 11A from the light incident surface 113. As an example, one or more LEDs are used as the light sources 31. An LED array in which a plurality of LEDs are arranged in a line may be used as a line light source. Instead of the LEDs, an organic electroluminescent (EL) light emitter or an inorganic EL light emitter capable of surface light emission, or a linear light source such as a fluorescent lamp or a cold cathode tube may be used.

The one or more light sources 31 may be mounted on a substrate and connected to a heat sink with a thermally conductive adhesive. In the example of FIG. 5, the light sources 31 are disposed below (at the −Z side of) the light guide plate 11A, but may be disposed above (at the +Z side of) the light guide plate 11A or may be disposed at the lateral side of the light guide plate 11A.

If the surface illumination device 10A is used for window illumination, the light guide plate 11A is formed of a material transparent to visible light. Light that has entered the light guide plate 11A from the light incident surface 113 is guided through the inside of the light guide plate 11A while being totally reflected by the first main surface 111 and the second main surface 112. Among light incident on the first main surface 111, light that does not satisfy the condition of total reflection is emitted from the first main surface 111 with the above-described light distribution. A specific configuration for emitting light from the first main surface with the light distribution illustrated in FIG. 3B will be described later.

<Example Configurations of Light Guide>

Figure 6A:
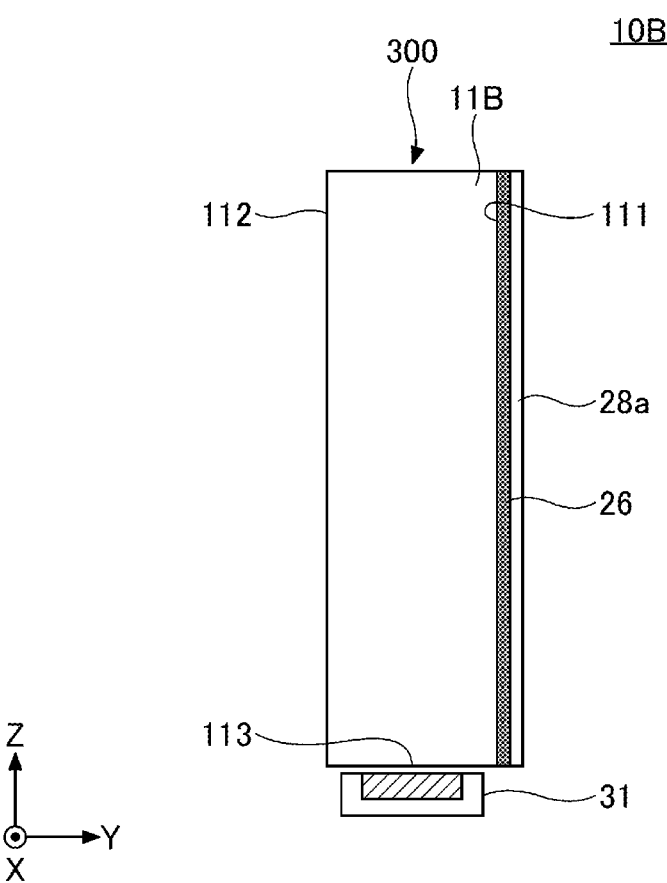
FIG. 6A is a drawing illustrating another example configuration of the surface illumination device.
Figure 6B:
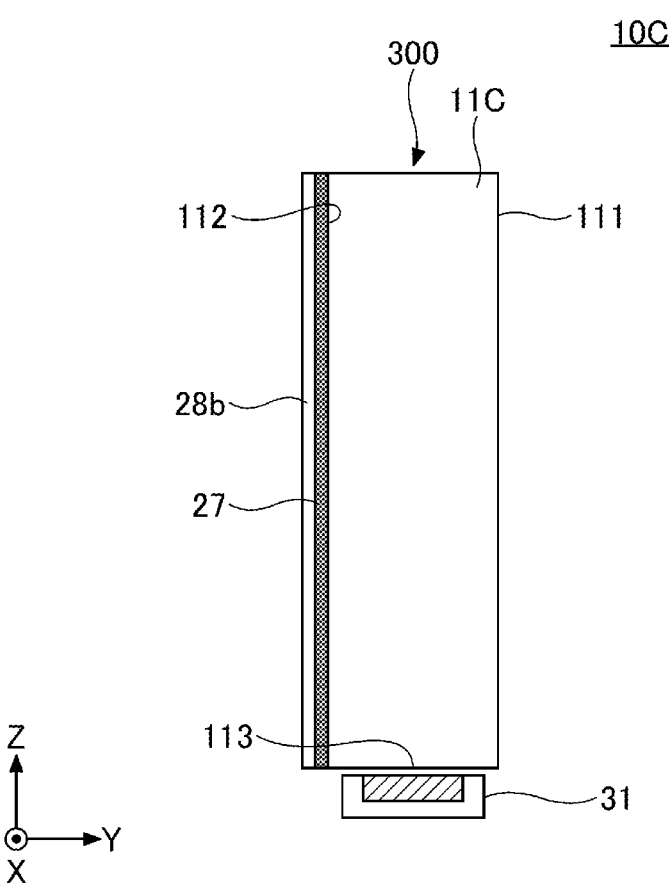
FIG. 6B is a drawing illustrating another example configuration of the surface illumination device.
Figure 6C:
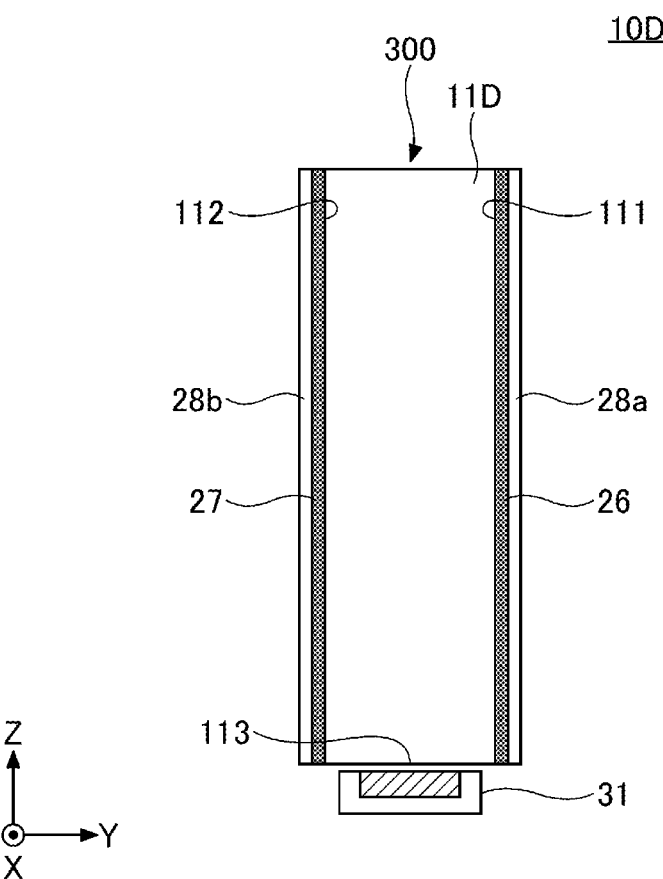
FIG. 6C is a drawing illustrating another example configuration of the surface illumination device.

FIGS. 6A through 6C illustrate example configurations of the light guide 300 of the surface illumination device 10. In the example configurations of FIGS. 6A through 6C, the light guide 300 includes a low refractive index layer having a lower refractive index than that of the light guide plate 11 on at least either the first main surface 111 or the second main surface 112. The visible light transmittance of the light guide 300, including the light guide plate 11 and the low refractive index layer, is, for example, 60% or more, 65% or more, 70% or more, 75% or more, 80% or more, 85% or more, or 90% or more. The visible light transmittance can be specified as the average value of transmittance obtained by measuring the visible light at measurement wavelengths of 380 nm or more to 780 nm or less by a spectrophotometer.

The low refractive index layer is a layer having a lower refractive index than the refractive index of the light guide plate 11. For example, in a case where the light guide plate 11 is composed mainly of PMMA, a refractive index $n_1$ of the light guide plate 11 is approximately 1.49. In this case, a refractive index $n_2$ of the low refractive index layer is preferably 1.30 or less, and is more preferably 1.20 or less. The low refractive index layer is not particularly limited; however, a low refractive index layer that includes voids as disclosed in International Publication Pamphlet No. WO2019/146628 can be used, the entire contents of which are incorporated herein by reference.

A surface illumination device 10B of FIG. 6A includes the light sources 31 and the light guide 300 that includes a light guide plate 11B. The light guide plate 11B includes the light incident surface 113 facing the light sources 31, the first main surface 111, and the second main surface 112. In addition, a low refractive index layer 26 is provided on the first main surface 111 of the light guide plate 11B. The low refractive index layer 26 may be covered by a cover layer 28a.

Light entering the light guide plate 11B from the light incident surface 113 is propagated through the inside of the light guide plate 11B while being totally reflected between the first main surface 111, on which the low refractive index layer 26 is provided, and the second main surface 112. Among light entering the interface between the first main surface 111 and the low refractive index layer 26, light that does not satisfy the condition of total reflection is emitted from the first main surface 111 with a predetermined light distribution. That is, the light is emitted such that an angle at which the intensity becomes maximum in the light distribution of light emitted from the center of the first main surface 111 is in the range of −90° or more to less than 0° in the YZ plane. In the horizontal direction (in the X-Y plane), the distribution of the emitted light may be in the range of −90° to +90°.

By providing the low refractive index layer 26 on the first main surface 111, loss of light due to dirt or scratches of the light emitting surface can be reduced.

A surface illumination device 100 of FIG. 6B includes the light sources 31 and the light guide 300 that includes a light guide plate 11C. The light guide plate 11C includes the light incident surface 113 facing the light sources 31, the first main surface 111, and the second main surface 112. In addition, a low refractive index layer 27 is provided on the second main surface 112 of the light guide plate 11C. The low refractive index layer 27 may be covered by a cover layer 28b.

Light entering the light guide plate 11C from the light incident surface 113 is propagated through the inside of the light guide plate 11C while being totally reflected between the first main surface 111 and the second main surface 112 on which the low refractive index layer 27 is provided. Among light entering the first main surface 111, light that does not satisfy the condition of total reflection is emitted from the first main surface 111, such that an angle at which the intensity becomes maximum in the light distribution of light emitted from the center of the first main surface 111 is in the range of −90° or more to less than 0° in the YZ plane.

In the horizontal direction (in the X-Y plane), the distribution of the emitted light may be in the range of −90° to +90°.

By providing the low refractive index layer 27 on the second main surface 112, loss of light due to dirt or scratches of the second main surface 112 can be reduced, and thus, light can be efficiently directed toward the first main surface 111.

A surface illumination device 10D of FIG. 6C includes the light sources 31 and the light guide 300 that includes a light guide plate 11D. The light guide plate 11D includes the light incident surface 113 facing the light sources, the first main surface 111, and the second main surface 112. In addition, in the light guide plate 11D, the low refractive index layer 26 is provided on the first main surface 111, and the low refractive index layer 27 is provided on the second main surface 112. The low refractive index layer 26 and the low refractive index layer 27 may be covered by the cover layer 28a and the cover layer 28b, respectively.

Light entering the light guide plate 11D from the light incident surface 113 is propagated through the inside of the light guide plate 11D while being totally reflected between the first main surface 111 and the second main surface 112. Among light entering the interface between the first main surface 111 and the low refractive index layer 26, light that does not satisfy the condition of total reflection is emitted from the first main surface 111 such that an angle at which the intensity becomes maximum in the light distribution of light emitted from the center of the first main surface 111 is in the range of −90° or more to less than 0° in the YZ plane. In the horizontal direction (in the X-Y plane), the distribution of the emitted light may be in the range of −90° to +90°.

By providing the low refractive index layer 26 and the low refractive index layer 27 on the first main surface 111 and the second main surface 112, respectively, loss of light due to dirt or scratches of the main surfaces of the light guide plate 11D can be reduced.

Figure 7:
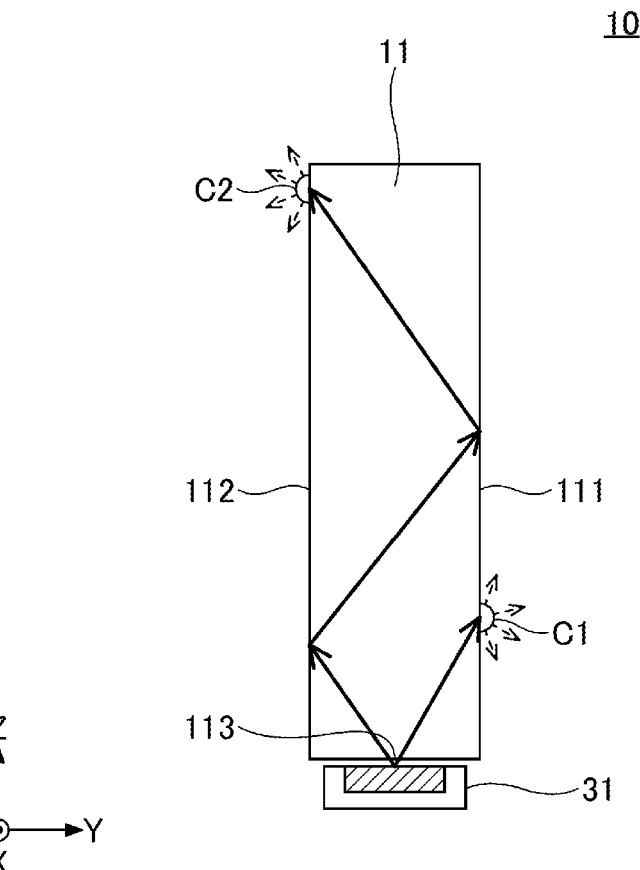
FIG. 7 is a drawing illustrating the significance of providing a low refractive index layer.

FIG. 7 is a drawing illustrating the significance of providing the low refractive index layer 26 or 27. It is assumed that dirt C1 or C2 such as sebum or sweat adheres to the first main surface 111 or the second main surface 112. Among light propagating through the inside of the light guide plate 11 while being totally reflected between the first main surface 111 and the second main surface 112, light incident on a position where the dirt C1 or C2 adheres would be scattered by the dirt C1 or C2 and would be lost before being emitted from the first main surface 111.

By providing the low refractive index layer 26 or 27 on at least either the first main surface 111 or the second main surface 112, light propagating through the inside of the light guide plate 11 can be prevented from being lost due to scattering or the like, and thus, a high light emission efficiency from the first main surface 111 can be maintained.

Figure 8:
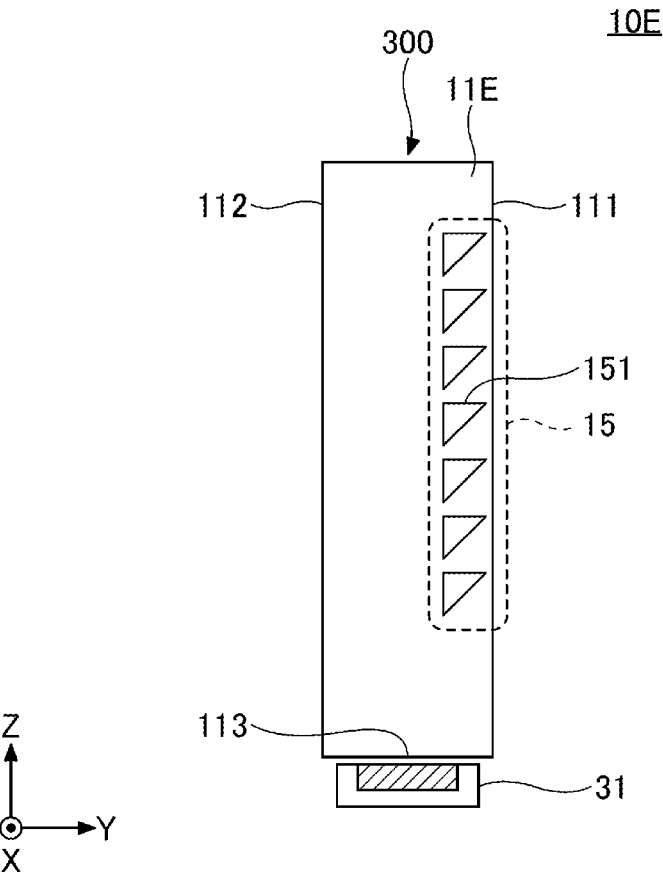
FIG. 8 is a drawing illustrating yet another configuration of the surface illumination device.
Figure 9:
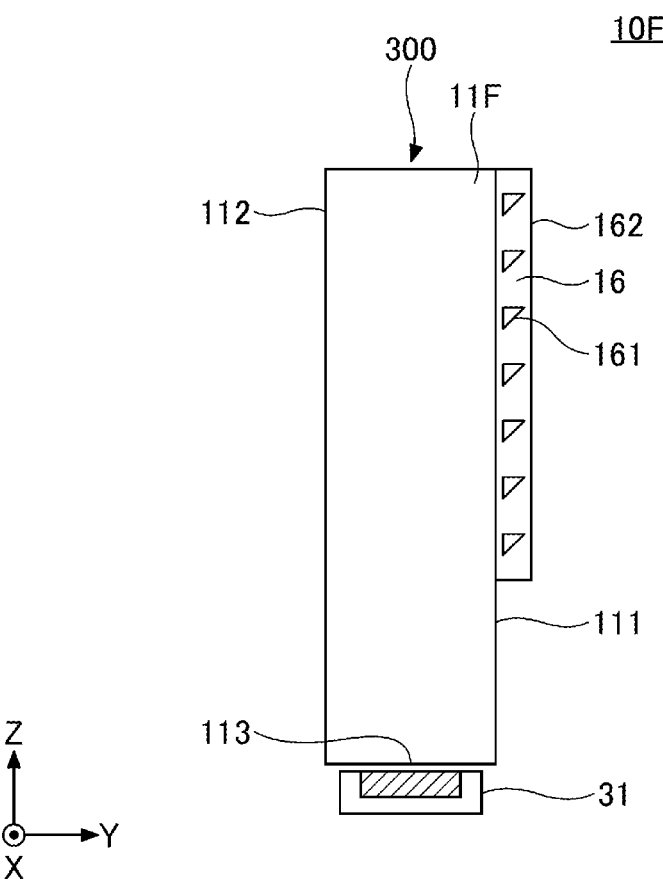
FIG. 9 is a drawing illustrating yet another configuration of the surface illumination device.
Figure 10:
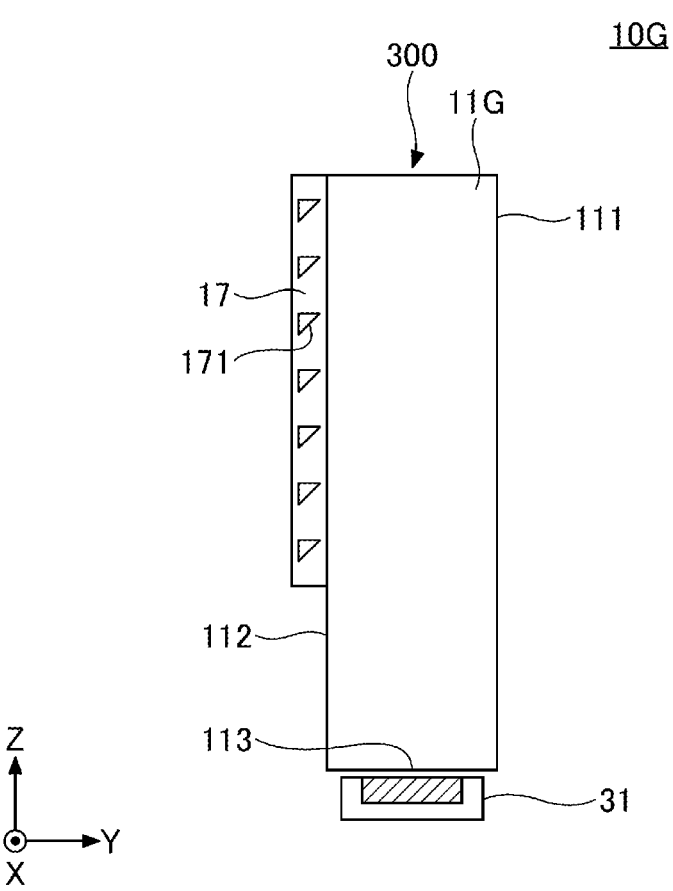
FIG. 10 is a drawing illustrating yet another configuration of the surface illumination device.

FIGS. 8 through 10 are drawings illustrating other example configurations of light guide plates. In the example configurations of FIGS. 8 through 10, optical cavities are utilized to output light from the first main surface 111 of the light guide plate 11 with the above-described light distribution.

FIG. 8 is a schematic view of a surface illumination device 10E. The surface illumination device 10E includes the light sources 31 and the light guide 300 that includes a light guide plate 11E. The light guide 300 includes a light extractor having one or more optical cavities 151 provided in the light guide plate 11E. The light extractor is provided along the first main surface 111.

For example, the visible light transmittance of the light guide 300 including the light guide plate 11E and the light extractor 15 is 60% or more, 65% or more, 70% or more, 75% or more, 80% or more, 85% or more, or 90% or more. The visible light transmittance is specified as the average value of transmittance obtained by measuring the visible light at measurement wavelengths of 380 nm or more to 780 nm or less by a spectrophotometer.

The optical cavities 151 are voids filled with a material having a lower refractive index than that of the light guide plate 11E. If the optical cavities 151 are voids filled with air, the optical cavities 151 are air cavities. Instead of air, the optical cavities 151 may be filled with a gas, a liquid, or a solid material having a lower refractive index than that of the light guide plate 11E.

The optical cavities 151 are designed such that light, entering the interfaces of the optical cavities 151 from the light guide plate 11E, is totally reflected toward the first main surface 111 and an angle at which the intensity becomes maximum in the light distribution of light emitted from the center of the first main surface 111 is in the range of −90° or more to less than 0° in the Y-Z plane.

In the light guide plate 11E, the plurality of optical cavities 151 are regularly or randomly provided along the flat first main surface 111. The size of the optical cavities 151 can be selected appropriately within a range that allows the optical cavities 151 to be provided inside the light guide plate 11E. Examples of the light guide plate including the optical cavities include, without limitation, light guide plates disclosed in International Publication Pamphlet No. WO2011/124765, International Publication Pamphlet No. WO2011/127187, International Publication Pamphlet No. WO2019/087118, and International Publication Pamphlet No. WO2019/182091, the entire contents of which are incorporated herein by reference.

The light guide plate 11E including the optical cavities 151 inside may be produced by bonding together a light guide layer, having a desired cavity pattern formed on a surface thereof, and a flat light guide layer without a cavity pattern. The light guide layers may be bonded by an adhesive-free lamination method such as microwave surface treatment, or may be pressure-bonded with an adhesive (including a pressure-sensitive adhesive). In order to reduce reflection at the interface between the light guide layers, it is preferable for the refractive indices of the light guide layers bonded together to be substantially the same. If an adhesive is used, it is preferable for the refractive index of the adhesive to be substantially the same as the refractive indices of the light guide layers.

For the formation of a cavity pattern on the light guide layer, laser patterning, direct laser imaging, laser drilling, masked or maskless laser irradiation, or electron beam radiation may be performed. As another method, individual characteristics (changes in refractive index values or the like) may be applied to a portion, where the optical cavities 151 are to be formed, by using printing, inkjet printing, screen printing, or the like. Micro-dispensing/nano-dispensing, dosing, direct writing, discrete laser sintering, micro-electrical discharge machining (micro-EDM), micro-machining, micro-molding, imprinting, embossing, or any other similar method may be used.

The light guide plate 11E allows light, entering the light guide plate 11E from the light incident surface 113, to propagate through the inside of the light guide plate 11E by total reflection and to be emitted from the first main surface 111 with the above-described light distribution.

FIG. 9 is a schematic view of a surface illumination device 10F. The surface illumination device 10F includes the light sources 31 and the light guide 300 that includes a light guide plate 11F. The light guide plate 11F includes a light extracting layer 16, functioning as a light extractor, on the first main surface 111. One or more optical cavities 161 are formed in the light extracting layer 16.

Similar to the light guide plate 11E of FIG. 8, the light extracting layer 16 having the optical cavities 161 can be formed by bonding together a flat light guide layer without a cavity pattern and a light guide layer having a cavity pattern formed on a surface thereof. Alternatively, a light guide layer having a cavity pattern may be directly bonded to the first main surface 111.

It is desirable for the refractive index of the light extracting layer 16 to be the same as or close to the refractive index of the light guide plate 11E so as to reduce undesired refraction and reflection. For example, if the light guide plate 11F is formed of polymethylmethacrylate (PMMA), the light extracting layer 16 is formed of a material having a refractive index that is the same as or close to the refractive index of the PMMA.

Light, entering the light extracting layer 16 from the light guide plate 11F, is totally reflected by the interfaces of the optical cavities 161, and is emitted from an outermost surface 162 of the light extracting layer 16. The interfaces of the optical cavities 161 are designed as follows. Light entering from the light guide plate 11F is totally reflected toward the outermost surface 162 of the light extracting layer 16, and is emitted such that an angle at which the intensity becomes maximum in the light distribution of light emitted from the center of the first main surface 111 is in the range of −90° or more to less than 0° in the Y-Z plane.

The light guide plate 11F allows light, entering the light guide plate 11F from the light incident surface 113, to propagate through the inside of the light guide plate 11F by total reflection and to be emitted from the light extracting layer 16 with the above-described light distribution.

FIG. 10 is a schematic view of a surface illumination device 10G. The surface illumination device 10G includes the light sources 31 and the light guide 300 that includes a light guide plate 11G. The light guide plate 11G includes a light extracting layer 17, functioning as a light extractor, on the second main surface 112. One or more optical cavities 171 are formed in the light extracting layer 17.

Similar to the light guide plate 11E of FIG. 8 and the light extracting layer 16 of FIG. 9, the light extracting layer 17 having the optical cavities 171 can be formed by bonding together a flat light guide layer without a cavity pattern and a light guide layer having a cavity pattern formed on a surface thereof. Alternatively, a light guide layer having a cavity pattern may be directly bonded to the second main surface 112.

It is desirable for the refractive index of the light extracting layer 17 to be the same as or close to the refractive index of the light guide plate 11G so as to reduce undesired refraction and reflection. For example, if the light guide plate 11G is formed of polymethylmethacrylate (PMMA), the light extracting layer 17 is formed of a material having a refractive index that is the same as or close to the refractive index of the PMMA.

Light, entering the light extracting layer 17 from the light guide plate 11G, is totally reflected by the interfaces of the optical cavities 171 and is directed toward the first main surface 111. As described above, an angle at which the intensity becomes maximum in the light distribution of light emitted from the center of the first main surface 111 is in the range of −90° or more to less than 0° in the Y-Z plane.

The light guide plate 11G allows light, entering the light guide plate 11G from the light incident surface 113, to propagate through the inside of the light guide plate 11G by total reflection, to be directed from the light extracting layer 17 toward the first main surface 111, and to be emitted from the first main surface 111 with the above-described predetermined light distribution.

According to any of the configurations in FIGS. 8 through 10, emitted light rays can be prevented from entering the user's eyes directly and flicker can be reduced, while illuminating the space with sufficient illuminance.

Figure 11:
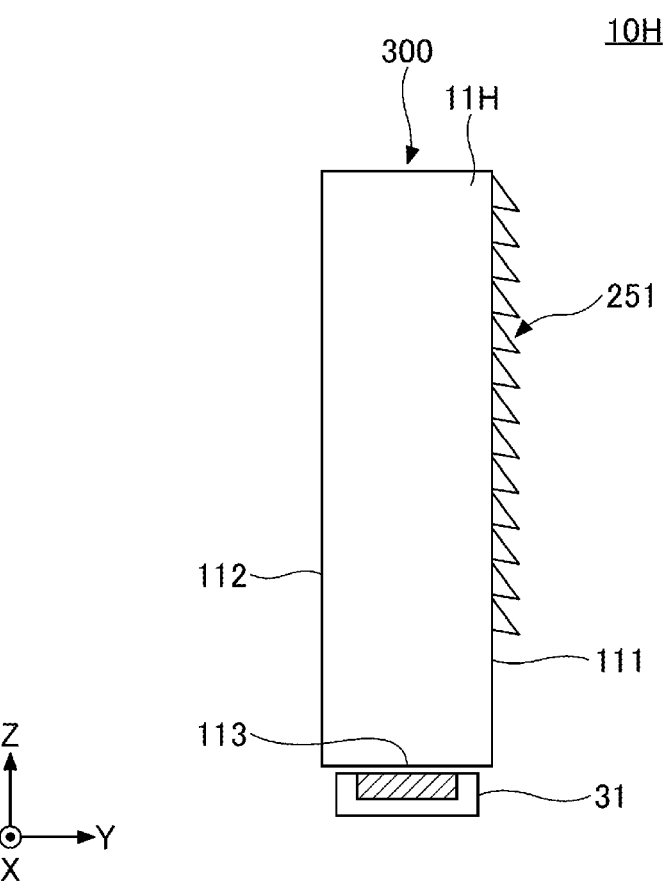
FIG. 11 is a drawing illustrating yet another configuration of the surface illumination device.

FIG. 11 is a schematic view of a surface illumination device 10H. The surface illumination device 10H includes the light guide 300 that includes a light guide plate 11H. The light guide plate 11H includes a prism part 251, which functions as a light extractor, on the first main surface 111. As the prism part 251, a prism sheet may be bonded to the first main surface 111, for example. In this case, the refractive index of the prism sheet is desirably the same as or close to the refractive index of the light guide plate 11H.

The size, the number of inclined surfaces, and the like of the prism part 251 can be selected appropriately within a range that allows the prism part 251 to be provided on the first main surface 111. Light, entering the prism part 251 from the light guide plate 11H, is refracted by the prism part 251 and emitted from the light guide plate 11H. The angle and pitch of the inclined surfaces of the prism part 251 are designed such that an angle at which the intensity becomes maximum in the light distribution of light emitted from the center of the first main surface 111 is in the range of −90° or more to less than 0° in the Y-Z plane, as described above.

Figure 12:
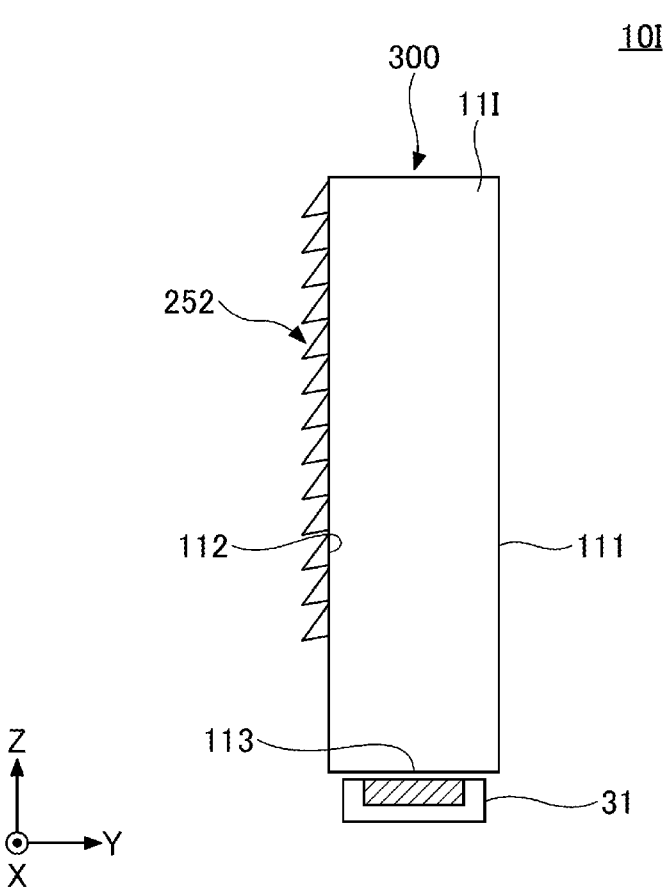
FIG. 12 is a drawing illustrating yet another configuration of the surface illumination device.

FIG. 12 is a schematic view of a surface illumination device 10I. The surface illumination device 10I includes the light guide 300 that includes a light guide plate 11I. The light guide plate 11I includes a prism part 252, functioning as a light extractor, on the second main surface 112. As the prism part 252, a prism sheet may be bonded to the second main surface 112, for example. In this case, the refractive index of the prism sheet is desirably the same as or close to the refractive index of the light guide plate 11I.

The size, the number of inclined surfaces, and the like of the prism part 252 can be selected appropriately within a range that allows the prism part 252 to be provided on the second main surface 112. Light, entering the prism part 252 from the light guide plate 11I, is refracted by the prism part 252 toward the first main surface 111 and emitted from the first main surface 111. The angle and pitch of the inclined surfaces of the prism part 252 are designed such that an angle at which the intensity becomes the maximum in the light distribution of light emitted from the center of the first main surface 111 is in the range of −90° or more to less than 0° in the Y-Z plane, as described above.

According to the configurations in FIGS. 11 and 12 as well, emitted light rays can be prevented from entering the user's eyes directly, and as a result, an illumination environment with less flicker and less oppressive feeling can be created.

Figure 13:
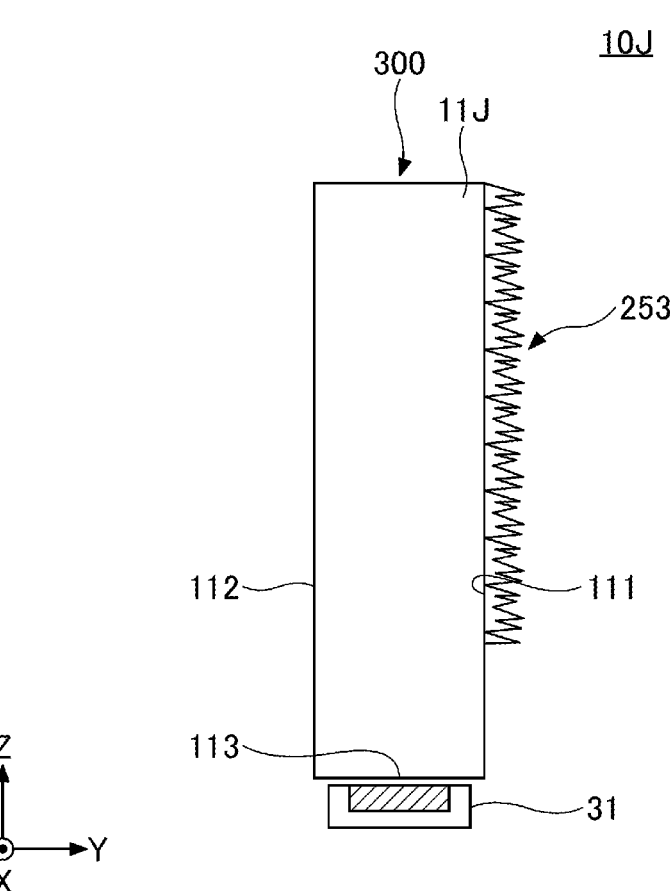
FIG. 13 is a drawing illustrating yet another configuration of the surface illumination device.

FIG. 13 is a schematic view of a surface illumination device 10J. The surface illumination device 10J includes the light guide 300 that includes a light guide plate 11J. The light guide plate 11J includes an uneven part 253, functioning as a light extractor, on the first main surface 111. The uneven part 253 includes a plurality of projections and recesses each having a width (or a diameter) and a height of approximately 1 μm to 5 μm. The uneven part 253 is designed such that an angle at which the intensity becomes maximum in the light distribution of light emitted from the center of the first main surface 111 is in the range of −90° or more to less than 0° in the Y-Z plane, as described above. As the uneven part 253, an optical film, having projections and recesses satisfying the above-described conditions, may be used.

Figure 14:
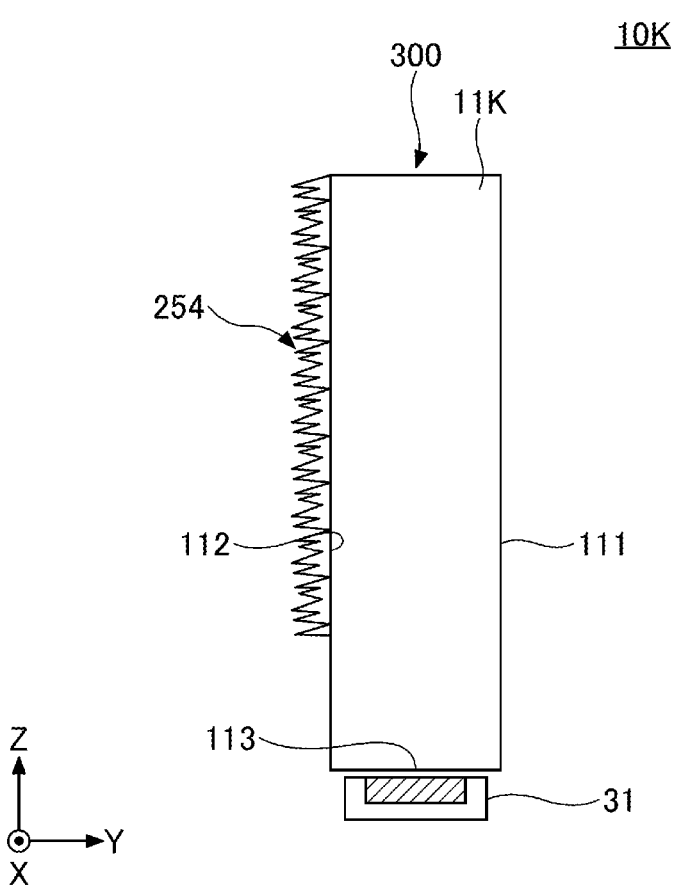
FIG. 14 is a drawing illustrating yet another configuration of the surface illumination device.

FIG. 14 is a schematic view of a surface illumination device 10K. The surface illumination device 10K includes the light guide 300 that includes a light guide plate 11K. The light guide plate 11K includes an uneven part 254, functioning as a light extractor, on the second main surface 112. The uneven part 254 includes a plurality of projections and recesses each having a width (or a diameter) and a height of approximately 1 μm to 5 μm. The uneven part 254 causes light, entering the uneven part 254 from the light guide plate 11K, to be deflected toward the first main surface 111 and emitted from the first main surface 111. The uneven part 254 is designed such that an angle at which the intensity becomes maximum in the light distribution of light emitted from the center of the first main surface 111 is in the range of −90° or more to less than 0° in the Y-Z plane, as described above. As the uneven part 254, an optical film, having projections and recesses satisfying the above-described conditions, may be used.

According to the configurations in FIGS. 13 and 14 as well, emitted light rays can be prevented from entering the user's eyes directly, and as a result, an illumination environment with less flicker and less oppressive feeling can be created.

Figure 15:
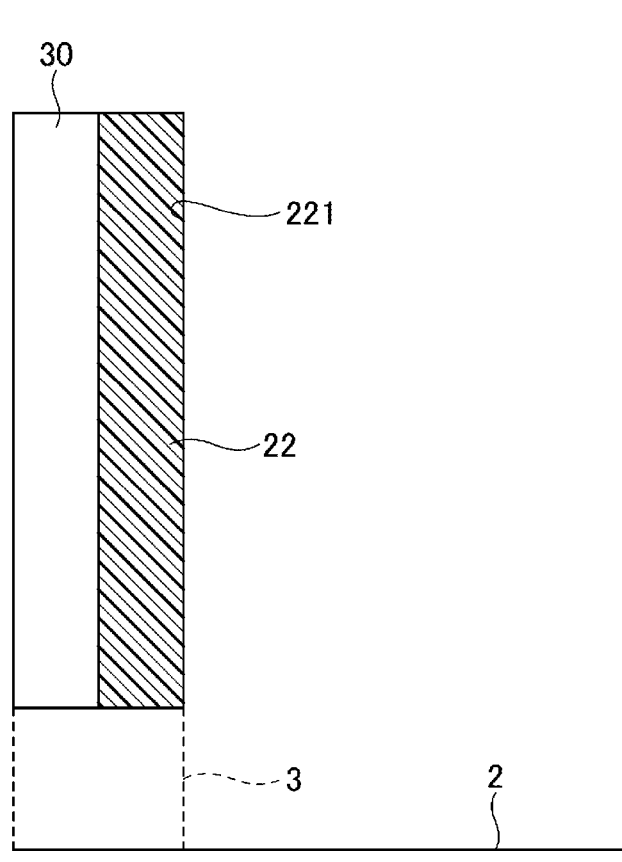
FIG. 15 is a drawing illustrating yet another configuration of the surface illumination device.
Figure 15:
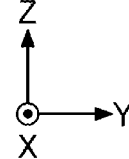

FIG. 15 is a drawing illustrating a surface illumination device 10L as a second example configuration of the surface illumination device 10. In the second example configuration, an area light source 30 is used. The surface illumination device 10L includes the area light source 30 and a viewing angle adjusting film 22. The area light source 30 is disposed perpendicularly to the floor surface 2 in the X-Z plane and emits light from the entire X-Z plane. As the area light source 30, an EL lamp may be used or a backlight for liquid crystal displays may be used.

The surface illumination device 10L may be used as part of the side wall 3, or may be provided on the surface of the side wall 3 or in the vicinity of the side wall 3.

The viewing angle adjusting film 22 has a light emitting surface 221 on the opposite side of the viewing angle adjusting film 22 from the area light source 30. The viewing angle adjusting film 22 has a function to set an angle at which the intensity becomes maximum in the light distribution of light emitted from the center of the area light source 30 to be in the range of −90° or more to less than 0° in the Y-Z plane. Among light incident on the viewing angle adjusting film 22 from the area light source 30, the viewing angle adjusting film 22 transmits only light incident in a specific direction or light incident at an incident angle in a specific range, and does not transmit the other light.

As the viewing angle adjusting film 22, a louver film in which a highly light-transmissive, transparent resin and a highly reflective resin are alternately arranged in the Z direction can be used, or a liquid crystal film can be used. If a liquid crystal film is used, voltage needs to be applied in order to control the alignment direction of liquid crystals. Therefore, a louver film is desirable from the viewpoint of energy saving.

Figure 16:
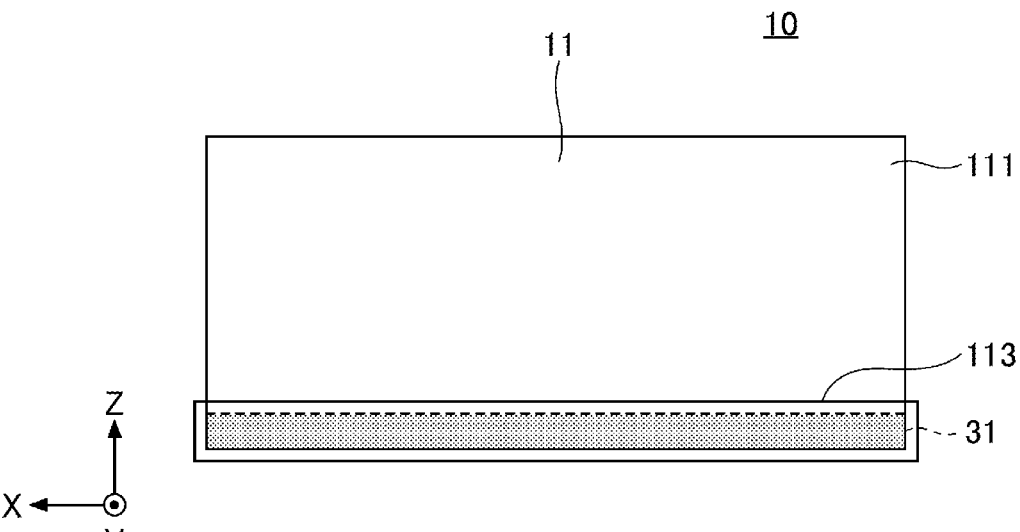
FIG. 16 is a drawing illustrating a usage scenario of the surface illumination device.
Figure 17:
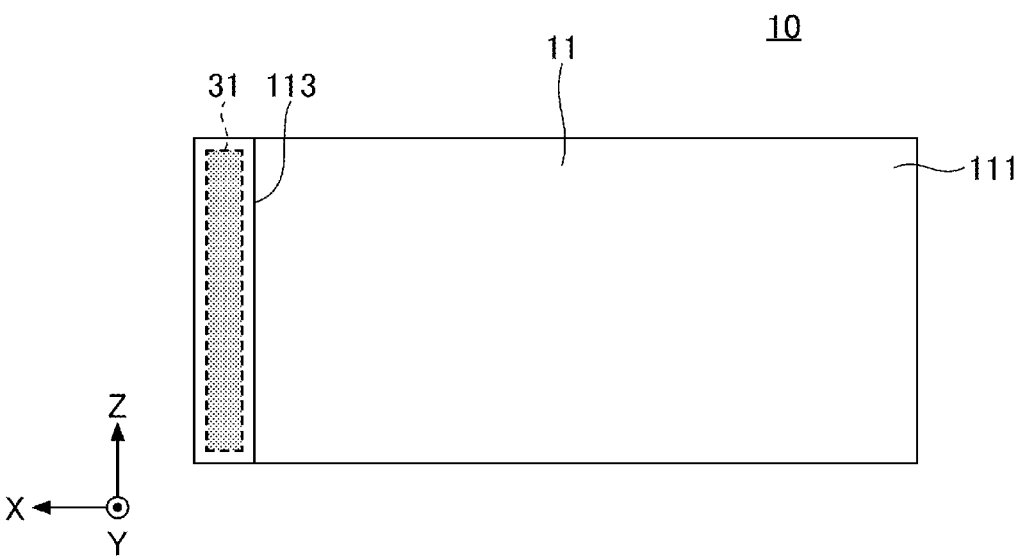
FIG. 17 is a drawing illustrating a usage scenario of the surface illumination device.

The viewing angle adjusting film 22 may be configured not to limit the viewing angle in the horizontal direction and configured to emit light at an angle of −90° to +90°.
<Usage Scenarios of Surface Illumination Device>
FIGS. 16 and 17 are drawings illustrating usage scenarios of the surface illumination device 10. FIGS. 16 and 17 illustrate configurations in which the area light source 30 is not used. In FIG. 16, the light incident surface 113 of the light guide plate 11 is situated parallel to the floor surface (X-Y plane), and the light sources 31 are disposed facing the light incident surface 113 of the light guide plate 11. As an example, a plurality of LEDs are arranged in the X direction. Light output from the light sources 31 is incident on the light incident surface 113 situated at the lower end of the light guide plate 11, propagates through the light guide plate in the Z direction, and is output from the first main surface 111 with the light distribution illustrated in FIG. 3B.

In FIG. 17, the light incident surface of the light guide plate 11 is disposed perpendicularly to the floor surface (X-Y plane), and the light sources 31 are disposed along the light incident surface 113 of the light guide plate 11. As an example, a plurality of LEDs are arranged in the Z direction. The side surface of the light guide plate 11, which faces the light sources 31, serves as the light incident surface 113.

Light output from the light sources 31 is incident on the light incident surface 113 situated at the side end of the light guide plate 11, propagates through the light guide plate 11 in the X direction, and is output from the first main surface 111 with the light distribution illustrated in FIG. 3B.

When the light guide plate 11 is formed of a material transparent to visible light, the surface illumination device 10 may be fitted into a window frame and used as a window during daytime. The surface illumination device 10 is lit by turning on the light sources 31 when it gets dark at night or the like. Note that a light source switch and wiring are not depicted.

The surface illumination device 10 may be used for wall illumination in a home, an office building, a school, a museum, or the like. In this case, the light guide plate 11 may be transparent or translucent to visible light. If the light guide plate 11 is transparent, a poster or a painting may be placed between a wall surface and the light guide plate 11, such that the surface illumination device may be used as an interior decoration during daytime. The surface illumination device 10L of FIG. 15 may be used for wall illumination.

In any of the usage scenarios, a situation in which illumination light enters the user's eyes directly can be avoided, and as a result, an illumination space with less flicker and less oppressive feeling can be created.

An illumination method, using a surface illumination device for placement on a side wall perpendicular to a floor surface, includes emitting light such that an angle at which an intensity becomes maximum in a light distribution of the light emitted from a center of a light emitting surface of the surface illumination device is in a range of −90° or more to less than 0° in a plane including a vertical axis and perpendicular to the light emitting surface, in a case where an axis passing through the center of the light emitting surface and perpendicular to the floor surface is defined as the vertical axis, and in the plane perpendicular to the light emitting surface, a direction extending from the center of the light emitting surface toward the floor surface along the vertical axis is defined as −90°, a direction extending from the center of the light emitting surface toward a side opposite to the floor surface is defined as +90°, and a direction orthogonal to the light emitting surface and extending from the center of the light emitting surface toward an emission side to which the light is emitted is defined as vertical 0°.

The above-described illumination method can also be performed by any of the surface illumination devices illustrated in FIGS. 5 through 17. With the above-described illumination method, an illumination space with less flicker and less oppressive feeling can be created.

Although the present invention has been described based on specific example configurations, the present invention is not limited to the above-described example configurations. Two or more of the configurations of the light guide plate described with reference to FIGS. 5 through 14 may be combined. For example, the low refractive index layer 26 or 27 and the viewing angle adjusting film 22 of FIG. 15 may be combined. The low refractive index layer 26 or 27 and optical cavities may be combined.

The light guide plate 11 may have any planar shape that can be used in any of the surface illumination devices. For example, the light guide plate 11 may have a triangle shape, a diamond shape, a circular shape, an elliptical shape, or the like. If the light guide plate 11 has a triangle shape, a plurality of light sources may be arranged on one side such that the light sources are alternately directed toward the other two sides. If the light guide plate 11 has a diamond shape, a plurality of light sources may be arranged so as to face one side or two adjacent sides. Even when the area light source 30 is used, the shape of the surface illumination device 10L in a plan view is not limited to a rectangular shape.

In any of the above cases, a comfortable illumination space with less flicker and less oppressive feeling can be achieved by emitting light from a light emitting surface with a predetermined light distribution.

This application is based on and claims priority to Japanese Patent Application No. 2020-127349, filed on Jul. 28, 2020, the entire contents of which are incorporated herein by reference.

DESCRIPTION OF THE REFERENCE NUMERALS 2 floor surface
3 side wall
10, 10A to 10L surface illumination device
11, 11A to 11L light guide plate
111 first main surface
112 second main surface
113 light incident surface
15 light extractor
151 optical cavity (void)
16, 17 light extracting layer
161, 171 optical cavity (void)
162 outermost surface
22 viewing angle adjusting film
221 light emitting surface
26, 27 low refractive index layer
28a, 28b cover layer
30 area light source
31 light source
251, 252 prism part
253, 254 uneven part
300 light guide

The invention claimed is:

1. A surface illumination device for placement on a side wall perpendicular to a floor surface in a space, the space including the side wall and the floor surface, the surface illumination device comprising:
   a light source; and
   a light guide including a light guide plate and configured to guide light from the light source,
   wherein an angle at which an intensity becomes maximum in a light distribution of light emitted from a center of a light emitting surface of the surface illumination device is in a range of −90° or more to less than 0° in a plane including a vertical axis and perpendicular to the light emitting surface, in a case where an axis passing through the center of the light emitting surface and perpendicular to the floor surface is defined as the vertical axis, and in the plane perpendicular to the light emitting surface, a direction extending from the center of the light emitting surface toward the floor surface along the vertical axis is defined as −90°, a direction extending from the center of the light emitting surface toward a side opposite to the floor surface is defined as +90°, and a direction orthogonal to the light emitting surface and extending from the center of the light emitting surface toward an emission side to which the light is emitted is defined as vertical 0°,
   wherein the light guide plate has a light incident surface on which the light from the light source is incident, a first main surface serving as the light emitting surface, and a second main surface opposite the first main surface, and wherein the second main surface is perpendicular to the light incident surface,
   wherein the light guide includes a light extractor configured to cause the light propagating through the light guide plate to be emitted from the first main surface with the light distribution,
   wherein the light extractor includes a plurality of voids enclosed within a material of the light extractor, and wherein the light extractor is provided either in the light guide plate, on the first main surface, or at a position proximal to the second main surface,
   wherein the plurality of voids are each configured to totally reflect the light propagating through the light guide plate and cause the light to be emitted from the first main surface with the light distribution,
   wherein the plurality of voids are arranged discretely along a light propagation direction and a direction perpendicular to the light propagation direction,
   wherein a visible light transmittance of the entire light guide, including the entire light extractor that includes a flat outer surface, is 80% or more, and
   wherein at least a back of the surface illumination device on a side of the second main surface is configured to be transparent such that the second main surface can be seen through from a space on a side of the first main surface.

2. The surface illumination device according to claim 1, wherein a light distribution of the light emitted from the center of the light emitting surface is in a range of −90° to +90° in a plane including a horizontal axis and parallel to the floor surface, in a case where an axis passing through the center of the light emitting surface and parallel to the floor surface is defined as the horizontal axis, a direction orthogonal to the light emitting surface and extending from the center of the light emitting surface toward the emission side to which the light is emitted is defined as horizontal 0° in the plane parallel to the floor surface, and a clockwise angle from the horizontal 0° is defined as a positive angle and a counterclockwise angle from the horizontal 0° is defined as a negative angle when the plane parallel to the floor surface is viewed from the side opposite to the floor surface.

3. The surface illumination device according to claim 1, wherein the light guide includes a low refractive index layer on either the first main surface or the second main surface, the low refractive index layer having a lower refractive index than a refractive index of the light guide plate.

4. The surface illumination device according to claim 3, wherein the light guide includes the low refractive index layer on each of the first main surface and the second main surface.

5. The surface illumination device according to claim 1, wherein the light incident surface of the light guide plate is disposed parallel to the floor surface.

6. The surface illumination device according to claim 1, wherein the light incident surface of the light guide plate is disposed perpendicularly to the floor surface.

7. A space comprising:

a floor surface;

a side wall disposed perpendicularly to the floor surface; and the surface illumination device for placement on the side wall according to claim 1.

8. An illumination method performed in a space including a floor surface, a side wall disposed perpendicularly to the floor surface, and the surface illumination device for placement on the side wall according to claim 1, the illumination method comprising:

emitting light such that an angle at which an intensity becomes maximum in a light distribution of the light emitted from a center of a light emitting surface of the surface illumination device is in a range of −90° or more to less than 0° in a plane including a vertical axis and perpendicular to the light emitting surface, in a case where an axis passing through the center of the light emitting surface and perpendicular to the floor surface is defined as the vertical axis, and in the plane perpendicular to the light emitting surface, a direction extending from the center of the light emitting surface toward the floor surface along the vertical axis is defined as −90°, a direction extending from the center of the light emitting surface toward a side opposite to the floor surface is defined as +90°, and a direction orthogonal to the light emitting surface and extending from the center of the light emitting surface toward an emission side to which the light is emitted is defined as vertical 0°.

* * * * *